(12) United States Patent
Lambert (10) Patent No.: US 9,727,720 B2
(45) Date of Patent: *Aug. 8, 2017

(54) CHALLENGE-RESPONSE AUTHENTICATION USING A MASKED RESPONSE VALUE

(71) Applicant: Certicom Corp., Mississauga (CA)

(72) Inventor: Robert John Lambert, Cambridge (CA)

(73) Assignee: Certicom Corp., Mississauga, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/690,996

(22) Filed: Nov. 30, 2012

(65) Prior Publication Data

US 2014/0156998 A1 Jun. 5, 2014

(51) Int. Cl.
*G06F 21/44* (2013.01)
*H04L 9/32* (2006.01)

(52) U.S. Cl.
CPC .......... *G06F 21/44* (2013.01); *H04L 9/3276* (2013.01); *G06F 2221/2103* (2013.01)

(58) Field of Classification Search
CPC ... H04L 9/3271; H04L 9/3273; H04L 9/0662; H04L 9/0822; H04L 9/14; H04L 9/3226;

(Continued)

(56) References Cited

U.S. PATENT DOCUMENTS

| 5,661,806 | A | | 8/1997 | Nevoux et al. |
| 5,666,415 | A | * | 9/1997 | Kaufman .............. H04L 9/3226 380/28 |

(Continued)

FOREIGN PATENT DOCUMENTS

| CA | 2611818 | 12/2006 |
| CN | 101223728 | 7/2008 |

(Continued)

OTHER PUBLICATIONS

Battery Authentication and Security Schemes, Texas Instruments, Application Report SLUA346—Jul. 2005, 7 pages.

(Continued)

*Primary Examiner* — Michael Pyzocha
(74) *Attorney, Agent, or Firm* — Fish & Richardson P.C.

(57) ABSTRACT

Challenge-response authentication protocols are disclosed herein, including systems and methods for a first device to authenticate a second device. In one embodiment, the following operations are performed by the first device: (a) sending to the second device: (i) a challenge value corresponding to an expected response value known by the first device, and (ii) a hiding value; (b) receiving from the second device a masked response value; (c) obtaining an expected masked response value from the expected response value and the hiding value; and (d) determining whether the expected masked response value matches the masked response value received from the second device. The operations from the perspective of the second device are also disclosed, which in some embodiments include computing the masked response value using the challenge value, the hiding value, and secret information known to the second device.

11 Claims, 6 Drawing Sheets

(58) Field of Classification Search
CPC ..... H04L 9/3242; H04L 9/32; H04L 2209/04; H04L 2209/12; H04L 63/0428; H04L 63/0869; Y02E 60/12; G06F 2221/2129; G06F 2221/2103; G06F 21/81; G06F 21/44; G06F 21/445; G06F 1/26; G06F 1/28; H02J 2007/0001; H02J 2007/0004
USPC ..... 713/169–172, 182, 189, 193; 726/26–27, 726/29–30, 34–36; 380/28, 255, 268
See application file for complete search history.

(56) References Cited

U.S. PATENT DOCUMENTS

| | | | |
|---|---|---|---|
| 6,070,246 | A | 5/2000 | Beser |
| 6,189,146 | B1* | 2/2001 | Misra ................ G06F 21/105 705/59 |
| 6,275,936 | B1 | 8/2001 | Kyojima et al. |
| 6,377,691 | B1 | 4/2002 | Swift et al. |
| 6,430,302 | B2 | 8/2002 | Rhoads |
| 6,611,913 | B1 | 8/2003 | Carroll |
| 6,731,196 | B1 | 5/2004 | Ruediger |
| 7,194,765 | B2 | 3/2007 | Blom |
| 7,554,288 | B2 | 6/2009 | Gangstoe et al. |
| 7,596,699 | B2 | 9/2009 | Kwok |
| 7,613,924 | B2 | 11/2009 | Shankar et al. |
| 7,667,429 | B2 | 2/2010 | Little |
| 7,863,858 | B2 | 1/2011 | Gangstoe et al. |
| 8,278,870 | B2 | 10/2012 | Little |
| 8,296,565 | B2 | 10/2012 | Taylor |
| 8,402,267 | B1 | 3/2013 | Graham et al. |
| 8,667,265 | B1 | 3/2014 | Hamlet |
| 8,842,833 | B2 | 9/2014 | Natarajan |
| 9,137,025 | B2 | 9/2015 | Lambert |
| 9,294,287 | B2 | 3/2016 | Lambert |
| 2003/0055962 | A1 | 3/2003 | Freund et al. |
| 2003/0061519 | A1 | 3/2003 | Shibata et al. |
| 2003/0154355 | A1 | 8/2003 | Fernandez |
| 2003/0204734 | A1 | 10/2003 | Wheeler |
| 2003/0233546 | A1* | 12/2003 | Blom ................ G06Q 20/02 713/168 |
| 2004/0015692 | A1* | 1/2004 | Green et al. ................ 713/169 |
| 2004/0034773 | A1* | 2/2004 | Balabine ................ A63F 13/12 713/168 |
| 2004/0066278 | A1 | 4/2004 | Hughes et al. |
| 2005/0001589 | A1 | 1/2005 | Edington et al. |
| 2005/0010782 | A1 | 1/2005 | Ohkubo |
| 2005/0123135 | A1 | 6/2005 | Hunt et al. |
| 2005/0149726 | A1* | 7/2005 | Joshi ................ G06F 21/51 713/164 |
| 2005/0187882 | A1* | 8/2005 | Sovio ................ G06Q 20/20 705/64 |
| 2005/0188206 | A1 | 8/2005 | Kwok |
| 2006/0015725 | A1 | 1/2006 | Voice et al. |
| 2006/0067592 | A1* | 3/2006 | Walmsley ................ B41J 2/2139 382/303 |
| 2006/0117176 | A1 | 6/2006 | Sasaki et al. |
| 2006/0143700 | A1 | 6/2006 | Herrmann |
| 2006/0149966 | A1* | 7/2006 | Buskey ................ H04L 9/3271 713/168 |
| 2006/0154631 | A1* | 7/2006 | Nakano ................ H04L 63/083 455/181.1 |
| 2006/0173943 | A1 | 8/2006 | Luzzi et al. |
| 2006/0204004 | A1* | 9/2006 | Shankar ................ G06F 21/81 380/44 |
| 2006/0205388 | A1 | 9/2006 | Semple et al. |
| 2006/0208850 | A1* | 9/2006 | Ikeuchi ................ H02J 7/0004 340/5.8 |
| 2006/0212701 | A1 | 9/2006 | Warwick |
| 2006/0219776 | A1 | 10/2006 | Finn |
| 2006/0230436 | A1 | 10/2006 | Holtmanns et al. |
| 2007/0001805 | A1* | 1/2007 | Utter ................ B60R 25/24 340/5.72 |
| 2007/0024235 | A1 | 2/2007 | Guthrie |
| 2007/0123304 | A1* | 5/2007 | Pattenden ................ G06F 1/26 455/557 |
| 2007/0123316 | A1 | 5/2007 | Little |
| 2007/0124584 | A1* | 5/2007 | Gupta ................ H04L 9/3271 713/168 |
| 2007/0143864 | A1* | 6/2007 | Cabana ................ H01M 10/42 726/36 |
| 2007/0157023 | A1 | 7/2007 | Kotzin |
| 2007/0192877 | A1 | 8/2007 | Yoo |
| 2007/0260892 | A1* | 11/2007 | Paul ................ G06F 21/31 713/193 |
| 2007/0278992 | A1 | 12/2007 | Paul et al. |
| 2008/0024268 | A1 | 1/2008 | Wong et al. |
| 2008/0091957 | A1 | 4/2008 | Everett et al. |
| 2008/0106287 | A1 | 5/2008 | Whetsel |
| 2008/0109899 | A1 | 5/2008 | Rijnswou Van et al. |
| 2008/0123863 | A1 | 5/2008 | Bade et al. |
| 2008/0136607 | A1 | 6/2008 | Ratcliff et al. |
| 2008/0159534 | A1* | 7/2008 | Rager ................ G06F 21/31 380/247 |
| 2008/0179401 | A1 | 7/2008 | Hart et al. |
| 2008/0201395 | A1 | 8/2008 | Luzzi et al. |
| 2008/0252477 | A1 | 10/2008 | Howard |
| 2008/0276092 | A1 | 11/2008 | Eberhardt et al. |
| 2009/0055645 | A1 | 2/2009 | Park et al. |
| 2009/0091427 | A1 | 4/2009 | Shiotsu et al. |
| 2009/0096574 | A1 | 4/2009 | Oberle |
| 2009/0102606 | A1 | 4/2009 | Kim et al. |
| 2009/0113534 | A1 | 4/2009 | Nanda et al. |
| 2009/0206937 | A1 | 8/2009 | Luzzi et al. |
| 2009/0240943 | A1 | 9/2009 | Brown et al. |
| 2009/0243539 | A1 | 10/2009 | Gangstoe et al. |
| 2009/0256717 | A1 | 10/2009 | Iwai |
| 2009/0265411 | A1 | 10/2009 | Maletsky |
| 2009/0292918 | A1 | 11/2009 | Mori |
| 2009/0295326 | A1 | 12/2009 | Daynes et al. |
| 2010/0005300 | A1* | 1/2010 | Klotsche ................ 713/170 |
| 2010/0011218 | A1 | 1/2010 | Shankar et al. |
| 2010/0024029 | A1 | 1/2010 | Sasaki et al. |
| 2010/0026236 | A1 | 2/2010 | Kamiyama et al. |
| 2010/0042824 | A1 | 2/2010 | Lee et al. |
| 2010/0056228 | A1* | 3/2010 | Brown ................ G06F 21/81 455/572 |
| 2010/0063932 | A1 | 3/2010 | Camenisch et al. |
| 2010/0148721 | A1 | 6/2010 | Little |
| 2010/0178961 | A1 | 7/2010 | Book et al. |
| 2010/0197367 | A1 | 8/2010 | Pattenden et al. |
| 2010/0205433 | A1 | 8/2010 | Neill et al. |
| 2010/0262312 | A1* | 10/2010 | Kubota ................ H01M 10/425 700/295 |
| 2010/0330950 | A1* | 12/2010 | Wells ................ H04B 1/3883 455/404.1 |
| 2011/0004924 | A1* | 1/2011 | Farrell ................ H04L 9/3271 726/4 |
| 2011/0078549 | A1 | 3/2011 | Thueringer et al. |
| 2011/0151834 | A1* | 6/2011 | Dabholkar ................ B60R 25/10 455/410 |
| 2011/0194694 | A1 | 8/2011 | Struik |
| 2011/0200193 | A1 | 8/2011 | Blitz et al. |
| 2011/0246769 | A1 | 10/2011 | Wilson |
| 2011/0271105 | A1 | 11/2011 | Shamir |
| 2011/0314288 | A1* | 12/2011 | Yogev ................ G06F 21/31 713/172 |
| 2012/0167169 | A1 | 6/2012 | Ge |
| 2012/0213361 | A1 | 8/2012 | Lim et al. |
| 2012/0223671 | A1 | 9/2012 | Seethaler et al. |
| 2012/0239555 | A1* | 9/2012 | Seethaler ................ G06F 21/44 705/39 |
| 2012/0242459 | A1 | 9/2012 | Lambert |
| 2012/0315959 | A1 | 12/2012 | Book et al. |
| 2013/0078912 | A1* | 3/2013 | San Vicente ................ A61B 5/0015 455/39 |
| 2013/0104247 | A1* | 4/2013 | Cakulev ................ H04L 67/1063 726/29 |
| 2013/0117488 | A1* | 5/2013 | Perry ................ G06F 13/4081 710/304 |

(56) References Cited

U.S. PATENT DOCUMENTS

| | | | |
|---|---|---|---|
| 2013/0166909 A1 | 6/2013 | Agrawal et al. | |
| 2014/0089670 A1 | 3/2014 | Maletsky | |
| 2015/0261692 A1* | 9/2015 | Benedetti | G06F 21/57 |
| | | | 713/193 |

FOREIGN PATENT DOCUMENTS

| | | |
|---|---|---|
| CN | 101945104 | 1/2011 |
| EP | 628935 | 12/1994 |
| EP | 1596529 | 11/2005 |
| EP | 1965539 A1 | 9/2008 |
| EP | 2159731 | 3/2010 |
| JP | 2008048166 | 2/2008 |
| JP | 2011135464 | 7/2011 |
| WO | 01/11817 A3 | 2/2001 |
| WO | 2007084601 | 7/2007 |
| WO | 2009/073969 | 6/2009 |
| WO | 2010/057312 | 5/2010 |

OTHER PUBLICATIONS

Atmel, CryptoAuthentication, AT88SA100S, Battery Authentication Chip, Preliminary, Copyright 2009 Atmel Corp. 21 pages.

Darrel Hankerson, Alfred J. Menezes, Scott A. Vanstone, Guide to Elliptic Curve Cryptography, SpringerVerlag, 2004. 332 pages.

International Search Report and Written Opinion issued in International Application No. PCT/CA2011/050438 on Oct. 21, 2011; 9 pages.

International Search Report and Written Opinion issued in International Application No. PCT/CA2011/050278 on Dec. 21, 2011; 8 pages.

Alfred J. Menezes, Paul C. van Oorschot, et Scott A. Vanstone, Handbook of Applied Cryptography—Chapter 1, 49 pages, 1996.

Alfred J. Menezes, Paul C. van Oorschot, et Scott A. Vanstone, Handbook of Applied Cryptography—Chapter 6, 33 pages, 1996.

Alfred J. Menezes, Paul C. van Oorschot, et Scott A. Vanstone, Handbook of Applied Cryptography—Chapter 7, 61 pages, 1996.

Alfred J. Menezes, Paul C. van Oorschot, et Scott A. Vanstone, Handbook of Applied Cryptography—Chapter 8, 38 pages, 1996.

Alfred J. Menezes, Paul C. van Oorschot, et Scott A. Vanstone, Handbook of Applied Cryptography—Chapter 9, 64 pages, 1996.

Alfred J. Menezes, Paul C. van Oorschot, et Scott A. Vanstone, Handbook of Applied Cryptography—Chapter 10, 41 pages, 1996.

Alfred J. Menezes, Paul C. van Oorschot, et Scott A. Vanstone, Handbook of Applied Cryptography—Chapter 11, 65 pages, 1996.

Alfred J. Menezes, Paul C. van Oorschot, et Scott A. Vanstone, Handbook of Applied Cryptography—Chapter 12, 54 pages, 1996.

Alfred J. Menezes, Paul C. van Oorschot, et Scott A. Vanstone, Handbook of Applied Cryptography—Chapter 13, 49 pages, 1996.

International Preliminary Report on Patentability issued in International Application No. PCT/CA2011/050438 on Oct. 10, 2013; 6 pages.

Atmel, Crypto-Authentication, High Level Security Models, Application Note, 8666A-SMIC-03/09, 11 pages, published in Mar. 2009 by Atmel Corporation.

Menezes, A. et al.; Handbook of Applied Cryptography; Chapter 9; CRC Press, 1996, pp. 321-368 and 397-405 (55 pages in total).

Preneel, Bart & van Oorschot, Paul C.; MDx-MAC and Building Fast MACs from Hash Functions; Appeared in Advances in Cryptology—CRYPTO 1995, Lecture Notes in Computer Science, D. Coppersmith (ed.), Springer-Verlag, 15 pages, 1995.

U.S. Appl. No. 10/025,873, filed Dec. 26, 2001.

Extended European Search Report for European Application No. 12195164.4-1956, dated Apr. 25, 2013, 5 pages.

U.S. Appl. No. 13/462,975, filed May 3, 2012.

U.S. Appl. No. 13/428,605, filed Mar. 23, 2012.

U.S. Appl. No. 13/691,101, filed Nov. 30, 2012.

Extended European Search Report issued in European Application No. 11862495.6 on Sep. 1, 2014; 6 pages.

Extended European Search Report issued in European Application No. 11864911.0 on Sep. 22, 2014; 6 pages.

Office Action issued in U.S. Appl. No. 13/691,101 on Jun. 13, 2014.

International Preliminary Report on Patentability issued in International Application No. PCT/CA2011/050278 on Nov. 21, 2013; 5 pages.

Office Action issued in U.S. Appl. No. 13/462,975 on Mar. 26, 2014; 17 pages.

Office Action issued in U.S. Appl. No. 13/462,975 on Sep. 8, 2014.

Office Action issued in U.S. Appl. No. 13/691,101 on Nov. 19, 2014.

United States Office Action in U.S. Appl. No. 13/428,605, dated Mar. 24, 2015, 14 pages.

Communication Pursuant to Article 94(3) EPC in European Application No. 12195164.4, dated Feb. 16, 2015, 5 pages.

Canadian Office Action in Canadian Application No. 2,832,348, dated Apr. 1, 2015, 3 pages.

Communication Pursuant to Article 94(3) EPC issued in European Application No. 12195164.4 on Aug. 22, 2016.

Pandya, "A Refresher on Cellular Mobile and Cordless Telecommunication Systems," Introduction to WLLs, Institute of Electrical and Electronics Engineers, 2004, pp. 47-81.

Moustafa "Authentication, Authorization and Accounting (AAA) in Hybrid Ad hoc Hotspot'Environments," WMASH'06, Sep. 29, 2006, Los Angeles, California, pp. 37-46.

Office Action issued in Canadian Application No. 2,832,348 on Mar. 22, 2016.

Office Action issued in Canadian Application No. 2,832,348 dated Mar. 1, 2017.

* cited by examiner

CHALLENGE-RESPONSE AUTHENTICATION USING A MASKED RESPONSE VALUE

FIELD

The following relates to the authentication of a product or device.

BACKGROUND

Challenge-response authentication is a process in which a first device authenticates a second device by sending to the second device a challenge. In response to the challenge, the second device returns a response, which is used by the first device to determine whether the second device is authentic. Challenge-response authentication can be as simple as the first device sending the second device a request for a secret password (this being the challenge), and in response the second device providing the secret password (this being the response to the challenge). If the response from the second device matches the expected response, then the second device is assumed to be authentic.

One type of challenge-response authentication works as follows. The first device sends a challenge value to the second device. The second device then uses the challenge value and secret information known to the second device in order to compute a response value. The response value is then sent to the first device. If the response value from the second device matches the expected response value, then the second device is assumed to be authentic. In such a protocol, the authenticity of the second device is linked to its knowledge of the secret information.

A counterfeit device trying to impersonate the second device would (presumably) not know the secret information and therefore would not be able to compute and provide the correct response value to the challenge from the first device.

One application in which challenge-response authentication is typically performed is in authenticating a battery used to supply power to a mobile device. The mobile device can be considered to be the first device, and the battery can be considered to be the second device. When the battery is inserted into the mobile device, the mobile device sends a challenge value to the battery. The battery must then provide a response value to the challenge. The mobile device authenticates the battery by verifying that the response value from the battery matches the expected response value.

BRIEF DESCRIPTION

Embodiments of the present application will be described, by way of example only, with reference to the accompanying figures wherein.

Like reference numerals are used in different figures to denote similar elements.

DETAILED DESCRIPTION

In general, there are disclosed systems and methods for performing challenge-response authentication in which the response value is masked. For example, systems and methods are disclosed in which a first device authenticates a second device by sending to the second device a challenge value and a hiding value. The second device uses these values to obtain a masked response value and sends the masked response value back to the first device. The first device then determines whether the received masked response value matches (e.g. is equal to or equivalent to) an expected masked response value.

In one embodiment, from the perspective of both the first and second devices, the following operations are performed: (1) the first device sends to the second device (a) a challenge value corresponding to an expected response value known by the first device, and (b) a hiding value; (2) the second device computes a masked response value using the challenge value, the hiding value, and secret information known to the second device; (3) the second device sends the masked response value to the first device; (4) the first device obtains an expected masked response value from the expected response value and the hiding value; and (5) the first device determines whether the expected masked response value matches the masked response value received from the second device. It will be appreciated that, for example, operation (4) can occur before operation (2) and/or (3) (or even before operation (1)). In this regard, it should be noted that the numerals are only being used in these introductory paragraphs to assist the reader, not to dictate a specific order of the operations.

In another embodiment, from the perspective of the first device, the following operations are performed: (1) the first device sends to the second device (a) a challenge value corresponding to an expected response value known by the first device, and (b) a hiding value; (2) the first device receives from the second device a masked response value; (3) the first device obtains an expected masked response value from the expected response value and the hiding value; and (4) the first device determines whether the expected masked response value matches the masked response value received from the second device. In some embodiments, the masked response value received from the second device is computed by the second device using the challenge value, the hiding value, and secret information known to the second device. It will be appreciated that, for example, the order of operations (2) and (3) can be interchanged or operation (3) can even be performed prior to operation (1).

In another embodiment, from the perspective of the second device, the following operations are performed: (1) the second device receives from the first device a challenge value and a hiding value; (2) the second device computes a masked response value using the challenge value, the hiding value, and secret information known to the second device; (3) the second device sends to the first device the masked response value for comparison to an expected masked response value. In some embodiments computing the masked response value comprises first computing a response value using the challenge value and the secret information, and then computing the masked response value using the response value and the hiding value. In other embodiments, computing the masked response value comprises computing the masked response value directly using the challenge value, the hiding value, and the secret information (for example, by computing a cryptographic hash of a message comprising the challenge value, the hiding value, and the secret information—note that the input of a cryptographic hash (i.e. that which is hashed) is typically referred to as a "message"). In other embodiments, the secret information itself may be a response value corresponding to the received challenge value, and the masked response is computed using the challenge value, the hiding value, and the secret information by first obtaining the secret information corresponding to the challenge value, and then masking the secret information.

In another embodiment, there is provided a device comprising: a memory configured to store a challenge value and an expected response value corresponding to the challenge value; and an interface configured to send to another device (i) the challenge value and (ii) a hiding value, and to receive a masked response value from the another device. The device is configured to (i) obtain an expected masked response value from the expected response value and the hiding value, and (ii) determine whether the expected masked response value matches the masked response value received from the another device.

In another embodiment, there is provided a device comprising: a memory configured to store secret information; an interface configured to receive from another device a challenge value and a hiding value, and to send to the another device a masked response value; and a processor configured to compute the masked response value using the challenge value, the hiding value, and the secret information.

In another embodiment, there is provided a processor readable medium having stored thereon processor readable instructions that, when executed, cause any of the methods described above or herein to be performed.

In the embodiments described above and herein, it will be appreciated that in general the response sent from the device being authenticated must be computed such that it is very difficult or impractical to obtain the secret information from the response.

For illustrative purposes, some specific example embodiments will now be explained in greater detail below in conjunction with the figures.

The embodiments set forth herein represent the necessary information to practice the claimed subject matter and illustrate the best way of practicing such subject matter. Upon reading the following description in light of the accompanying figures, those of sufficient skill will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to a computer/processor readable storage medium or media for storage of information, such as computer/processor readable instructions, data structures, program modules, or other data. A non-exhaustive list of examples of computer/processor readable storage media include magnetic cassettes, magnetic tape, magnetic disk storage or other magnetic storage devices, optical disks such as CD-ROM, DVDs, Blu-ray, or other optical storage, volatile and non-volatile, removable and non-removable media implemented in any method or technology, RAM, ROM, EEPROM, flash memory or other memory technology. Any such computer/processor storage media may be part of a device or accessible or connectable thereto. Any application or module herein described may be implemented using computer/processor readable/executable instructions that may be stored or otherwise held by such computer/processor readable storage media.

Figure 1:
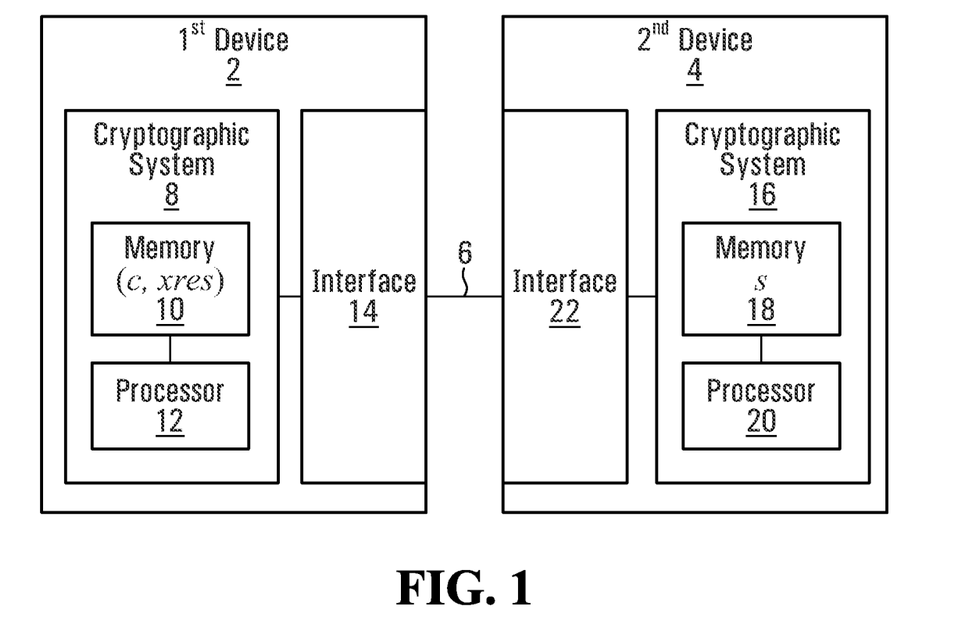
FIG. 1 is a block diagram of a first device and a second device.

Referring first to FIG. 1, a first device 2 and a second device 4 are illustrated. These two devices communicate with each other via a communication channel 6, which is generally considered to be unsecure. The first device 2 includes a cryptographic system 8 comprising a memory 10 and a processor 12. The second device also includes a cryptographic system 16 comprising a memory 18 and a processor 20. Each cryptographic system 8 and 16 is connected to a respective interface 14 and 22, which allows the first device 2 and the second device 4 to communicate with each other over a channel 6. Each interface 14 and 22 may be, for example, a simple physical interface, such as the physical interface between two parts (e.g. pins, pads, etc.), which when connected together form the channel 6. Or, if the first and second devices are remotely connected, each interface may comprise the physical hardware that interfaces between each device and the channel 6 (e.g. an antenna, a transmitter or receiver, etc.)

Although the term "processor" is used when describing units 12 and 20, more generally this is meant to refer to any hardware that performs processing or computations and which implements the operations described herein. Other terms could include a data processing apparatus, a microprocessor, a cryptographic unit, a processing unit, a cryptographic processor, etc.

Only a single processor 12 and memory 10 are shown in the cryptographic system 8 of device 2, and only a single processor 20 and memory 18 are shown in the cryptographic system 16 of device 4. However, it will be appreciated that when implemented in practice, more than one processor and/or memory may be used. Also, some of the processor and/or memory may be located outside the cryptographic system. The portion located inside the cryptographic system will typically be secure, although this is not necessarily the case. As one example, the processor 12 or 20 may be a general microprocessor that is not secure, whereas the memory 10 and 18 may be a secure partition of a larger and generally unsecure memory. The reason cryptographic systems 8 and 16 are generally designated as such in FIG. 1 is because each one implements one or more cryptographic protocols to perform challenge-response authentication, such as the protocols described herein. The cryptographic operations performed by the processors of the cryptographic systems typically include comparisons between and/or arithmetic operations on data strings (such as bit strings) representing parameters, values, integers, messages, or data in the protocols to produce data strings representing the output of the protocols.

In the illustrated embodiment, the first device 2 is shown as separate from the second device 4. This is a simplification for ease of illustration. In practice, the first device 2 and the second device 4 may be physically separated, or one may be embedded in or be part of the other. For example, the second device 4 may be a battery embedded in the first device 2.

In some embodiments, the first device 2 is a mobile device, and the second device 4 is an accessory of the mobile device. For example, the second device may be a battery, as is the case in the specific example implementation described later with respect to FIGS. 4 and 5.

Other examples of the first and second devices are as follows. The first device 2 may be a mobile device and the second device 4 may be another accessory of the mobile device, such as a keyboard, a headset, a charger, or a replacement part. The first device 2 may be a printer and the second device 4 may be a component of the printer, such as an ink cartridge. The first device 2 may be a consumer electronic device, appliance, system, or product, and the second device 4 may be a peripheral component associated with the electronic device, appliance, system, or product, or the second device 4 may be a component embedded in or connected to the electronic device, appliance, system, or product. The first device 2 may be a network component and the second device 4 may be a mobile or stationary device connecting to the network component, or vice versa. In some embodiments, either or both of the first device 2 and the second device 4 may be a separately manufactured device that can be attached to or embedded in a product to allow for the challenge-response authentication described herein. These are all only examples. In general, the first device 2 is any device that connects to and/or communicates with a second device 4 that the first device 2 wishes to authenticate. In this regard, the terms "first" and "second" are simply being used to generically and respectively refer to the authenticator that wishes to authenticate another device/product (i.e. the first device), and the device/product being authenticated (i.e. the second device).

The first device 2 has stored in its memory 10 a challenge value c and an associated expected response value xres. In some embodiments, there may be n pairs of challenge/expected response values $(c_i, xres_i)$, i=1 . . . n. As an example, there may be 64 challenge/expected response values stored in memory 10 (in this case n would equal 64). However, only one is illustrated in FIG. 1 for ease of reference.

The second device 4 has stored in its memory 18 secret information s. As one example, this secret information s may be a secret key, although this need not be the case and in general is not the case. As an example, the secret information s may be loaded into the memory 18 of the second device 4 at the time of manufacture, or it may be securely provided to the second device 4 in another manner. The secret information s is secret in that it is private and not publically accessible (or at least it is not supposed to be publically accessible). However, this does not necessarily mean that the secret information is not shared and/or known by different trusted devices. For example, it may be the case that every authentic second device 4 manufactured has the same secret information s. That being said, it could also be the case that the secret information s is not shared or known by any other devices.

Figure 2:
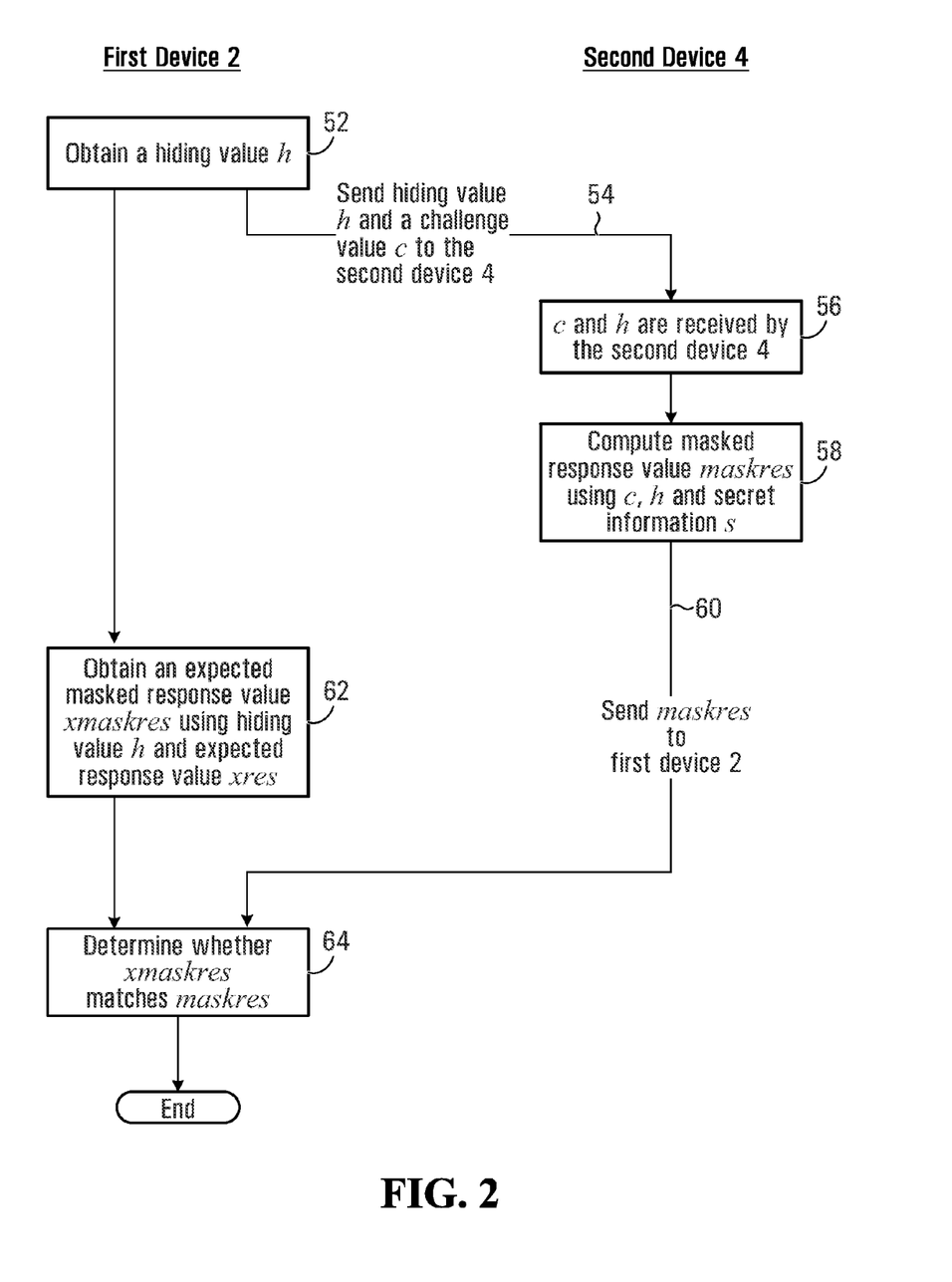
FIG. 2 is a flow diagram of one method of authenticating a device.

FIG. 2 illustrates a method in which the first device 2 authenticates the second device 4. It should be noted that the method of FIG. 2 is described generally in order to assist in making clear all of the different variations that are possible and contemplated. Specific example implementations are described later.

Turning therefore to FIG. 2, at step 52, the first device 2 obtains a hiding value h.

At step 54, the first device 2 sends to the second device 4 (via interface 14 and communication channel 6) the challenge value c and the hiding value h. If there are several pairs of challenge/expected response values to chose from, the first device 2 selects one of the pairs and sends the challenge value of that pair with the hiding value h.

At step 56, the second device 4 receives the challenge value c and the hiding value h at the interface 22.

At step 58, the processor 20 of the second device 4 computes a masked response value maskres using (i) the challenge value c and the hiding value h received from the first device 2 and (ii) its secret information s.

At step 60, the second device 4 sends the masked response value maskres to the first device 2 (via interface 14 and communication channel 6).

At step 62, the first device 2 obtains an expected masked response value xmaskres using (i) the hiding value h and (ii) the expected response value xres that corresponds to the challenge value c sent to the second device 4.

At step 64, the processor 12 of the first device 2 then determines whether the expected masked response value xmaskres matches (e.g. is equal to or equivalent to) the masked response value maskres from the second device 4. If they do match, then the second device 4 is considered to be authenticated. For example, determining whether the expected masked response value xmaskres matches the masked response value maskres may be a simple as verifying that these two values are equal or equivalent.

Some of the steps of FIG. 2 will be discussed in more detail below such that example implementations and variations will become clearer.

As mentioned above, at step 52 the first device 2 obtains a hiding value h. The hiding value h may be obtained in one of several ways. For example, in some embodiments, the hiding value h is generated using a random number generator (not illustrated). In other embodiments, the hiding value h is derived from a counter (also not illustrated) or a timestamp, or from any other existing hardware in the first device 2 in which a state exists and is periodically updated, such as a state value in a register. In some embodiments, the hiding value h is sent to the cryptographic system 8 from another component or external entity (e.g. a server external to the first device 2). By any of these ways, the hiding value h is updated on a regular basis, so that the hiding value can change over time and/or at the control of the first device 2.

As mentioned above, at step 58, the processor 20 of the second device 4 computes a masked response value maskres using (i) the challenge value c and the hiding value h received from the first device 2 and (ii) its secret information s. In some embodiments, the processor 20 computes the masked response value maskres as follows:

$$\mathrm{mask}res = f(s,c,h),$$

where $f(\bullet)$ is a function that includes as an input the values c, s, and h. As one example, the function $f(\bullet)$ can be a progressive cryptographic hash, i.e., a cryptographic hash having the property that $f(x,y,z)=f[f(x,y),z]$. For example, in some embodiments, this is a cryptographic hash function that accepts as an input a concatenation of the values c, s, and h and computes the hash in a progressive manner such that $f(x\|y\|z)=f[f(x\|y)\|z]$, where $\|$ represents concatenation.

In other embodiments, the processor 20 computes the masked response value maskres in two steps. First, the processor 20 computes a response value res using the received challenge value c and its secret value s:

$$res = g(s,c),$$

where $g(\bullet)$ is a function that includes as an input the values c and s.

As one example, the function $g(\bullet)$ may be a cryptographic hash that accepts as an input a value comprising a concatenation of c and s (possibly concatenated with other information or data).

Examples of cryptographic hashes that can be used herein include a Secure Hash Algorithm (SHA) such as SHA-1, SHA-2, SHA-3, a "keyed" cryptographic hash, such as the Hash-based Message Authentication Code (HMAC), or other cryptographic hashes that are known, such as the prefix algorithm cryptographic hash, the suffix algorithm cryptographic hash, or the envelope algorithm cryptographic hash. Some examples of cryptographic hashes are disclosed in the publication "MDx-MAC and Buliding Fast MACs from Hash Functions", authored by Bart Preneel and Paul C. van Oorschot, and published in Advances in Cryptology-CRYPTO 1995, Lecture Notes in Computer Science 963, D. Coppersmith (ed.), Springer-Verlag, pp. 1-14, 1995.

Many of the cryptographic hashes mentioned in the paragraph above are progressive or at least are based on hash primitives that are progressive.

As another example, the function g(•) may be a symmetric cipher, which uses the secret information s and/or the challenge c as the cipher key, and encrypts a message that includes some or all of the portion of s and/or c not used as the cipher key.

As another example, the function g(•) may be an asymmetric cryptographic operation, such as a private key operation or a portion of a key agreement protocol.

Once the response value res=g(s,c) is computed, the processor 20 masks the response value res using the hiding value h as follows:

$$maskres = p(res, h),$$

where p(•) is a function that includes as an input the values res and h and acts to mask the value res. For example, the function p(•) can be a cryptographic hash, a one-way function, or a symmetric cipher. The masking function should be such that it is impractical or difficult to determine res based on maskres, but this is not absolutely necessary. For example, even if p(•) amounted to a simple XOR between res and h, masking would still occur, although it would not be a particularly effective mask since it could be inverted without too much trouble. However, it would still mean an extra step for counterfeit devices trying to perform a replay attack and would therefore make such an attack less efficient.

In some embodiments ƒ(•), g(•), and p(•) can be the same function (e.g. the same cryptographic hash), although this is not necessary, as long as these functions are chosen such that the masked response computed by the authentic second device 4 matches the expected masked response.

As discussed earlier, at step 62 the first device 2 obtains an expected masked response value xmaskres using (i) the hiding value h and (ii) the expected response value xres that corresponds to the challenge value c sent to the second device 4. In some embodiments, this can be as simple as the processor 12 looking up xmaskres in a look-up table or receiving xmaskres from an external component (such as an external server). In other embodiments, xmaskres is computed by the processor 12 using h and xres. That is:

$$xmaskres = q(xres, h),$$

where q(•) is a function that includes as an input the values xres and h. For example, the function q(•) may be a cryptographic hash or a symmetric cipher. In any case, it will be appreciated that in embodiments in which xmaskres is computed, it must be computed so that it matches maskres if maskres is from an authentic device. Therefore, if xmaskres is computed by the processor 12, then q(•) must be chosen such that q(xres,h) matches p(res,h) or ƒ(s,c,h) for any given hiding value h, and associated s, c, xres, and res values. Typically, q(•) and p(•) will be the same function The method of FIG. 2 may help prevent (or make it more inefficient for) a counterfeit device to impersonate the authentic second device 4, since if the counterfeit device sees the masked response maskres sent from the authentic second device 4, and then tries to use the masked response maskres in the future in response to a challenge by the first device 2, the maskres will very likely not work because it is dependent upon a hiding value h, and the hiding value h can be changed by the first device 2 at a future instance of the challenge-response protocol. This will be discussed in more detail below in relation to replay attacks.

Figure 3:
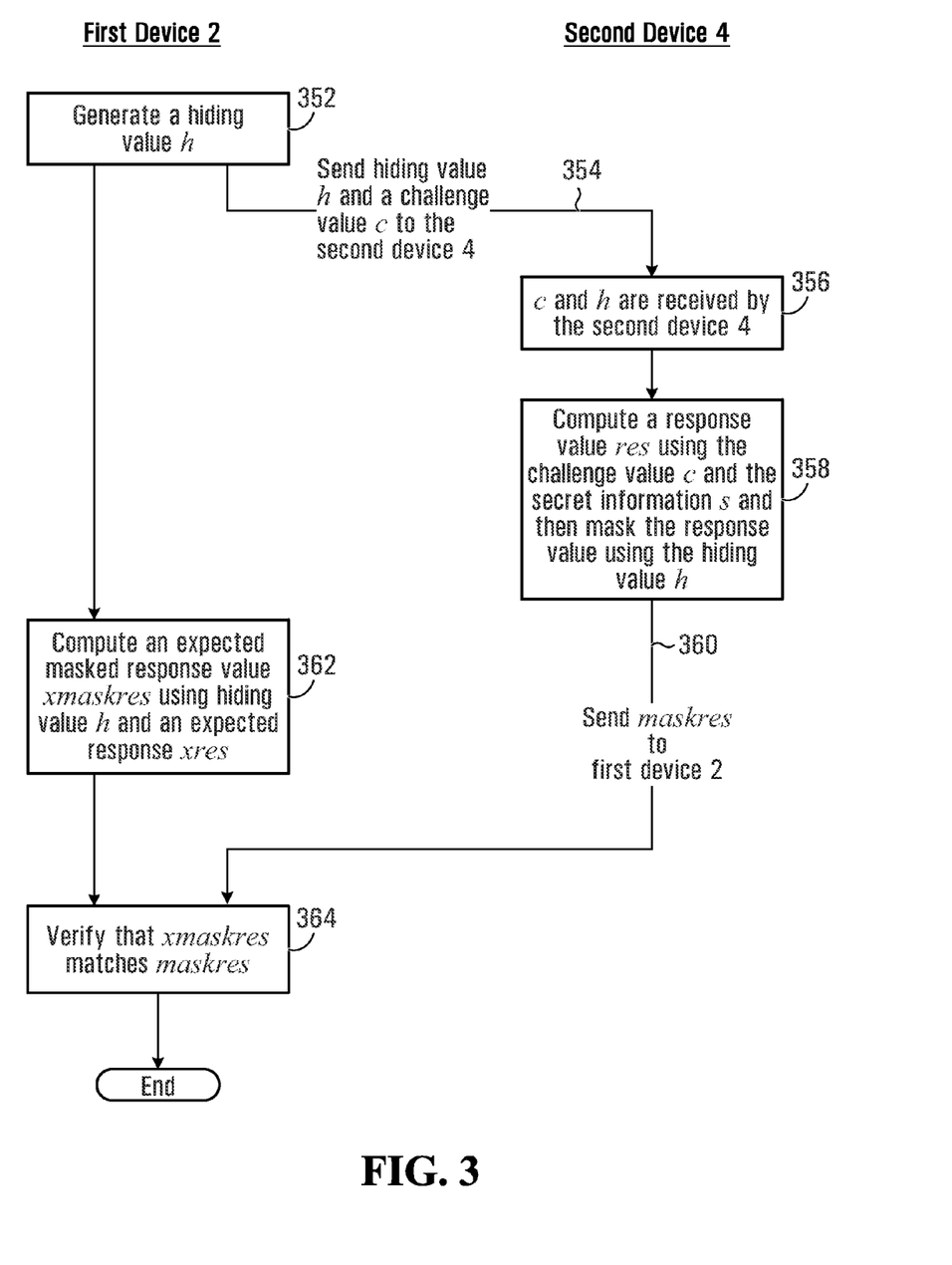
FIG. 3 is a flow diagram of another method of authenticating a device.

The method of FIG. 2 is described generally in order to make it clear that different variations are contemplated and possible. FIG. 3 is a more specific example implementation that makes a replay attack more difficult (and perhaps impractical in some embodiments). The replay attack and the method of FIG. 3 are described in more detail below.

As mentioned above, the second device 4 includes secret information s. The authenticity of the second device 4 is linked to its knowledge of the secret information s, since the value of the response sent by the second device 4 (masked or not) depends upon the secret information s. A counterfeit device would presumably not know the secret information s and therefore not generate the correct response value.

The first device 2 need not know the secret information s, but it does need to know an expected response from the second device 4 based on the secret information s. In order to minimize exposure of the secret information s, the first device 2 is often not provided with the secret information s, but is instead provided with one or more challenge response pairs—each pair including a challenge value c and a corresponding expected response value xres. The expected response value xres corresponds to (e.g. is equal to or equivalent to) what would be computed by an authentic second device 4 based on the challenge value c and its secret information s. For example, as illustrated in FIG. 1, the memory 10 of the first device 2 includes one challenge/expected response pair (c,xres).

When it is time to authenticate the second device 4, the first device 2 sends the challenge value c to the second device 4, and receives back the response res from the second device 4 (which was computed using the secret information s and the challenge value c). The first device 2 then verifies that the res matches the expected response xres.

The problem with such an exchange is that it may be subject to a replay attack. In particular, a counterfeit device could view c and res as they are transmitted over the channel 6. Then, in the future the counterfeit device could impersonate the second device 4. When the first device 2 sends the challenge value c to the counterfeit device, it can return res, and the first device 2 will assume the counterfeit device is authentic. Multiple challenge response pairs (e.g. say 64 pairs) could be stored in the memory 10 of the first device 2, and different challenges sent each time so as to try and prevent such an attack, but the provision of multiple challenge response pairs adds complexity and manufacturing cost, and it does not necessarily make a replay attack impractical, since the counterfeit device could still view the channel 6 and eventually learn the different challenge values and the corresponding responses.

However, by masking the response value using a hiding value that is under the control of the first device 2 and is regularly changed by the first device 2, a replay attack can be mitigated (if not made impractical in some embodiments). This is because the true response value res obtained by the authentic second device 4, which may never change if the challenge value c never changes, will be modified by a hiding value h that is issued by the first device 2 and modified over time (e.g. each time authentication is performed).

A specific implementation of the method of FIG. 2 that is directed towards mitigating or making impractical a replay attack is described below in relation to FIG. 3.

At step 352, the first device 2 generates a hiding value h, either randomly or based on a counter or a state of a register (or other hardware) that is regularly changing.

At step 354, the first device 2 sends to the second device 4 the challenge value c and the hiding value h generated in step 352.

At step 356, the second device 4 receives the challenge value c and the hiding value h.

At step 358, the processor 20 of the second device 4 computes a response value res using the received challenge value c and the secret value s of the second device 4, as follows:

$$res = g(s,c),$$

where g(•) is a function that includes as an input the values c and s. In this example implementation, g(•) is either a cryptographic hash that includes as its input a concatenation of s and c or a symmetric cipher that encrypts a message comprising c using a key comprising s. The processor 20 of the second device 4 then masks the response value res using the received hiding value h as follows:

$$maskres = p(res,h),$$

where p(•) is a function that includes as an input the values res and h. In this example embodiment, the function p(•) is a masking function in which it is difficult or impractical to obtain the input from the output. For example, p(•) may be a one-way function, a cryptographic hash, or a symmetric cipher. This means that it will be difficult or impractical for a counterfeit device/interloper to determine res from maskres. This is beneficial because if res could be determined from maskres, a replay attack would be enabled (or at least made easier).

At step 360, the second device 4 then sends the masked response value maskres to the first device 2.

At step 362, the first device 2 computes an expected masked response value xmaskres as follows:

$$xmaskres = p(xres,h),$$

where p(•) is the same function used by the second device 4 to compute maskres. The function p(•) need not be secret.

Finally, at step 364, the processor 12 of the first device 2 then verifies that the expected masked response value xmaskres matches the masked response value maskres from the second device 4. If they do match, then the second device 4 is considered to be authenticated.

In the method of FIG. 3, a replay attack is mitigated (e.g. made harder, less efficient, or perhaps even impractical) for the following reason. Each time authentication is performed, or at least on a regular basis, the first device 2 obtains and sends a new (different) hiding value. This hiding value masks (and therefore changes) the response value from the second device 4. This means that the value sent in response to the challenge, which is what can be viewed and obtained by a counterfeit device, is always changing depending upon the hiding value, which is under the control of the first device 2 performing the authentication.

Thus, the counterfeit device may be able to view and obtain the challenge value c, the hiding value h, and the masked response maskres. However, if the counterfeit device later tries to impersonate the second device 4 by sending maskres in response to the challenge value c, this will not work because the hiding value h will have changed, and so the previous maskres value viewed and obtained by the counterfeit device will no longer be the correct value.

In step 358 of FIG. 3, the processor 20 of the second device 4 computes the masked response maskres in two steps:

$$res = g(s,c),$$

and then:

$$maskres = p(res,h).$$

In some embodiments, g(•) and p(•) can instead be replaced with a single cryptographic hash that computes the hash progressively, such as a cryptographic hash function that has the property that:

$$\text{cryptographic hash}(x\|y\|z) = \text{cryptographic hash}[\text{cryptographic hash}(x\|y)\|z], \qquad (1)$$

where x, y, and z are components of the input message (e.g. each one corresponding to one of s, c, and h), and ∥ represents concatenation.

Then, for example, the left side of (1) can be computed by the second device 4 having the secret value to obtain the masked response as follows:

$$maskres = f(s,c,h) = \text{cryptographic hash}(s\|c\|h).$$

The right side of (1) can then be computed by the first device 4 to obtain the expected masked response as follows:

$$xmaskres = \text{cryptographic hash}(res\|h).$$

Since res=cryptographic hash(s∥c), then xmaskres=maskres if the second device 4 is authentic (i.e. if the second device 4 does have the correct secret information s).

A benefit of this implementation is that hardware and/or computational resources are saved, since only a single function (the progressive cryptographic hash) needs to be implemented by the device being authenticated.

It is important to point out a few implementation aspects when using the progressive cryptographic hash implementation described herein. In particular, the specific cryptographic hash used must be implemented such that the expected masked response value xmaskres computed by the first device 2 matches the masked response value maskres computed by the second device 4 (assuming the second device 4 is authentic). This may require modifying an existing cryptographic hash or using a basic cryptographic hash or cryptographic hash primitive to ensure this is the case.

As one example, a correct concatenation of the input values will need to be used. For example, in general $$\text{cryptographic hash}(h\|s\|c) \neq \text{cryptographic hash}[h\|\text{cryptographic hash}(s\|c)] \text{ and}$$

$$\text{cryptographic hash}(h\|c\|s) \neq \text{cryptographic hash}[h\|\text{cryptographic hash}(c\|s)],$$

although they may be equal for some cryptographic hash functions. Thus, a concatenation must be chosen that allows the right and left sides to match, e.g.:

$$\text{cryptographic hash}(x\|y\|z) = \text{cryptographic hash}[\text{cryptographic hash}(x\|y)\|z].$$

Also, many cryptographic hash functions, such as SHA-1 and SHA-2 (for example), include "strengthening" in which the hash function automatically computes a length of the input message and incorporates that length value into the message, for example, by appending the length value onto the message. This is common, as it helps prevent length extension attacks. However, if such a "strengthened" cryptographic hash is used, then it very well may be the case that:

$$\text{cryptographic hash}(x\|y\|z) \neq \text{cryptographic hash}[\text{cryptographic hash}(x\|y)\|z].$$

Such a "strengthened" cryptographic hash would need to be modified in order to accommodate or avoid the addition of the length value to the input. As one example, the un-strengthened basic hash primitive can be used to implement the progressive cryptographic hash, rather than the typical strengthened hash function that incorporates a value representing the length of the input message into the input. Although a basic un-strengthened hash function is more susceptible to length-extension attacks (and therefore generally undesirable), in applications in which the challenge and response values have a fixed length, such as in authenticating a battery, there is generally not a concern about length extension attacks. Therefore, it is actually beneficial in such applications to use a hash function in which a value representing the length of the input is not incorporated into the input (an "un-strengthened" hash function), since length-extension attacks are not as much of a concern and since by using an un-strengthened hash function the progressive property can be more easily used as above to reduce the hardware/computational requirements.

Figure 4:
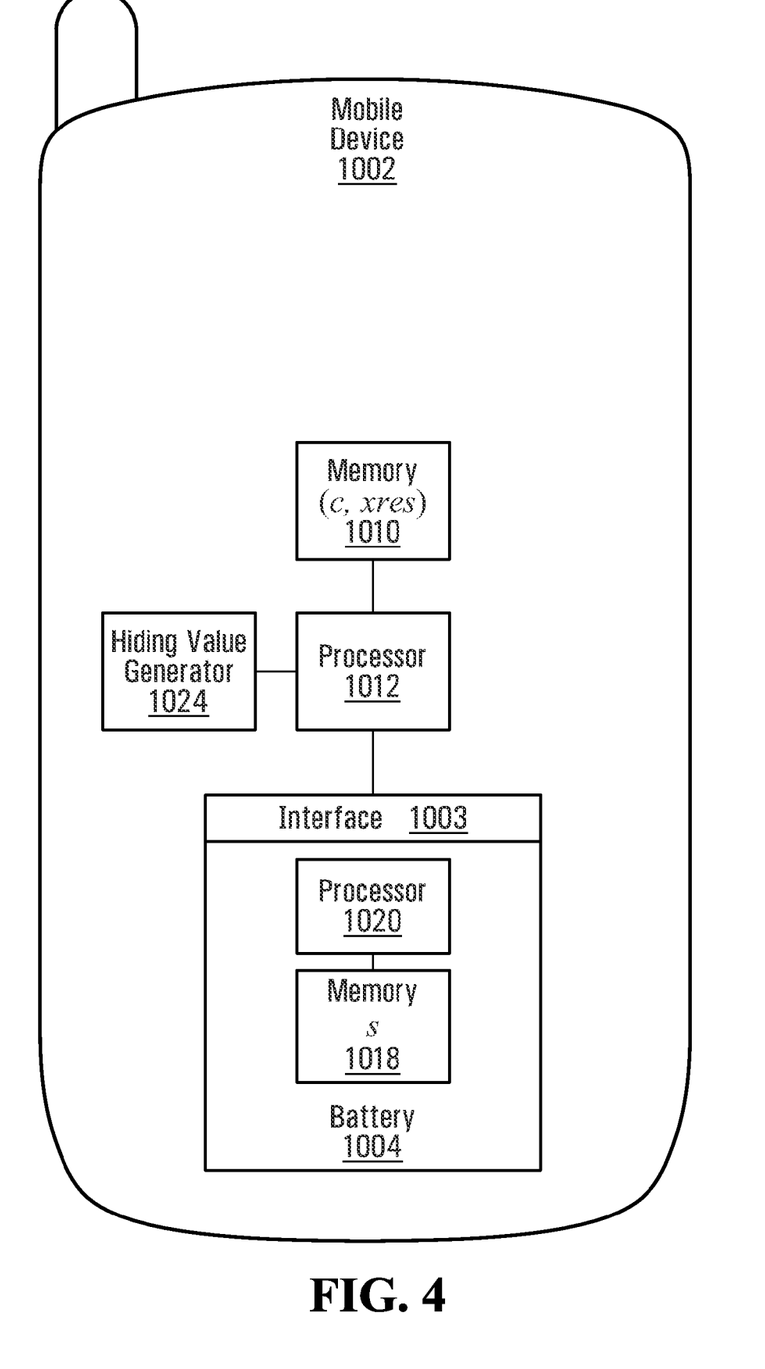
FIG. 4 is a block diagram of a mobile device and a battery.
Figure 5:
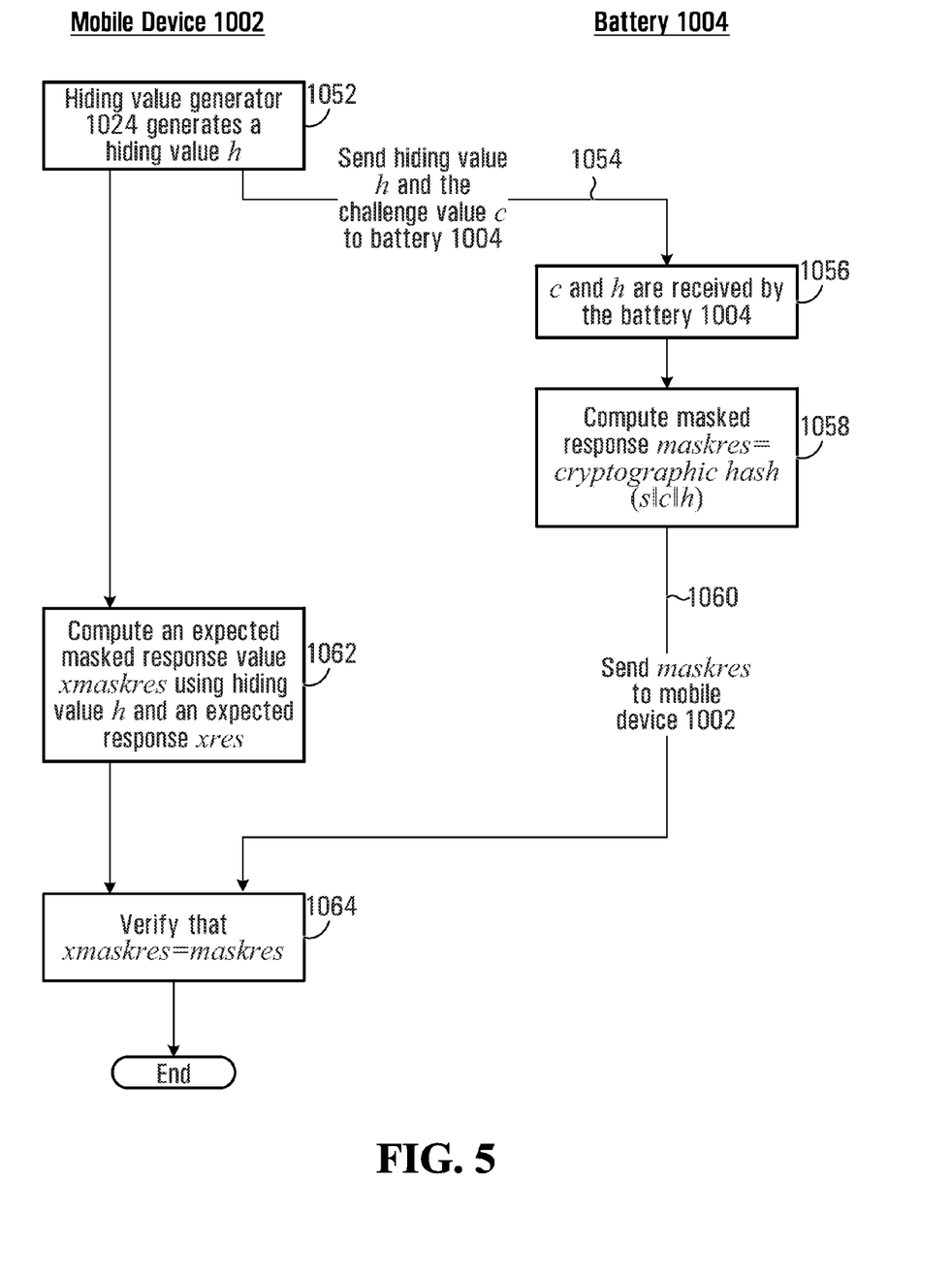
FIG. 5 is a flow diagram of one method of authenticating a battery.

Turning now to FIGS. 4 and 5, another specific example implementation will be described in detail below in the context of a mobile device authenticating a battery.

With reference to FIG. 4, a mobile device 1002 is illustrated. The mobile device 1002 includes a memory 1010, a hiding value generator 1024, and a processor 1012.

A battery 1004 is inserted into the mobile device 1002. In FIG. 4, the battery 1004 is shown inserted, and an interface 1003 allows the battery 1004 and the mobile device 1002 to communicate. The battery includes a processor 1020 and a memory 1018.

In the memory 1018 of the battery 1004, secret information s is stored. All authentic batteries manufactured for the particular mobile device 1002 typically include this same secret information s. The information is secret in that it is not publically accessible. However, this does not mean that the secret information is not shared and/or known by different devices. As just mentioned, in this embodiment all authentic batteries manufactured for the particular mobile device 1002 would typically include the same secret information.

In the memory 1010 of the mobile device 1002, a challenge value c is stored, along with a corresponding expected response value xres. Specifically, at the time of manufacture of the mobile device 1002, this challenge/expected response pair is loaded into the memory 1010 by a trusted source. That is, to minimize unnecessary distribution of the secret information s, and to reduce the computations requirements of the processor 1012, the secret information s is not provided to the mobile device 1002, but rather a specific challenge value c is provided along with an associated expected response xres that corresponds to the response that would be computed by the battery 1004 using the secret information s. Each mobile device manufactured is typically loaded with a different challenge/expected response pair, although this need not be the case.

In order to authenticate the battery 1004, the method of FIG. 5 is performed. The battery 1004 may be authenticated, for example, each time the mobile device 1002 is powered on.

At step 1052, the hiding value generator 1024 generates a hiding value h. The hiding value generator 1024 is either a random number generator that produces a random number used as h, or the hiding value generator 1024 generates h based on a counter or a state of a register (or other hardware) that is constantly changing, such that each time the method of FIG. 5 is performed the generated hiding value h is (in general) different from the previously generated hiding value, and the generated hiding value h does not repeat itself on a regular basis or follow a predictable pattern.

At step 1054, the mobile device 1012 sends to the battery 1004 (via the interface 1003) the challenge value c from memory 1010 and the hiding value h generated in step 1052.

At step 1056, the battery 1004 receives the challenge value c and the hiding value h.

At step 1058, the processor 1020 of the battery 1004 computes a masked response value maskres as follows:

maskres=cryptographic hash(s∥c∥h), where the cryptographic hash is one that is progressively computed and has the property that:

cryptographic hash(x∥y∥z)=cryptographic hash[cryptographic hash(x∥y)∥z].

For example, the cryptographic hash can be a basic cryptographic hash primitive or any other type of cryptographic hash that does not incorporate into the input of the hash a value representing the length of the input. An example of such a hash is the basic primitive used in implementing more sophisticated cryptographic hashes (e.g. the basic primitive used in the cryptographic hash functions SHA-1, SHA-2, and SHA-3).

When implementing the progressive cryptographic hash, the implementation aspects discussed earlier must be considered to ensure that cryptographic hash(x∥y∥z) does indeed match cryptographic hash[cryptographic hash(x∥y)∥z]. This may mean, for example, having s, c, and h concatenated in a different order from the specific example order s∥c∥h shown above and/or modifying an existing cryptographic hash or using a cryptographic hash primitive such that the cryptographic hash does not incorporate into the input of the hash a value representing the length of the input message.

At step 1060, the battery 1004 then sends the masked response value maskres to the mobile device 1002 via the interface 1003.

At step 1062, the processor 1012 of the mobile device 1002 computes the expected masked response value xmaskres as follows:

xmaskres=cryptographic hash(xres∥h), where the cryptographic hash function is the same function used in step 1058.

Finally, at step 1064, the processor 1012 of the mobile device 1002 then verifies that the expected masked response value xmaskres is equal to the masked response value maskres from the battery 1004. If they are equal, then the battery 1004 is considered to be authenticated.

In a variation of the specific example method above, instead of the battery 1004 computing:

maskres=cryptographic hash(s∥c∥h), the battery 1004 computes maskres=cryptographic hash[cryptographic hash(s∥c)∥h].

That is, the battery 1004 calls the same cryptographic function twice: first to compute res=crytograhic hash(s∥c), and then to compute maskres=crytograhic hash(res∥h). The cryptographic hash therefore need not be modified to ensure it has the progressive property discussed above, but can be a cryptographic hash from a standardized cryptographic hash library (e.g. including one that may be strengthened). In step 1062, the mobile device 1002 would then use the same cryptographic hash to compute the expected masked response value. Of course, it will be appreciated that the specific order of the concatenation may be modified.

Each time the method of FIG. 5 is performed, the same challenge value c is used since it is the only one possessed by the mobile device 1002 and the mobile device 1002 in this specific embodiment will likely never again be connected to (or have access to) a trusted source to receive an updated challenge/expected response pair. However, since a different hiding value h is used, the masked response and expected masked response values will change each time authentication is performed. This makes a replay attack more difficult (and perhaps impractical) since whatever masked response maskres is obtained by a counterfeit battery, it will no longer be useful, as during the authentication of the counterfeit battery in the future, the required maskres value will be different (due to a different hiding value h issued by the mobile device 1002). This is the case even though the challenge value c does not change.

In the embodiment of FIGS. 4 and 5, it is assumed that the mobile device 1002 is only loaded with one challenge/expected response pair. Alternatively, a plurality of different challenge/expected response pairs can be provided, and during some or all authentications another challenge value different from the last one is sent to the battery from the mobile device. Even in such embodiments, masking the response as described herein is useful, as the hiding value can be used to make the masked response change all the time (that is, each time the authentication is performed due to the change in the hiding value), rather than the response being confined to a finite number of possibilities corresponding to the number of challenge/expected response pairs stored by the mobile device. In such embodiments, each mobile device manufactured can be provided with a subset of all possible challenge/response pairs. This subset would typically be small compared to the set of all possible challenge/response pairs. Each subset provided to each mobile device can be disjoint from the other subsets, although this need not necessarily be the case.

Finally, with reference to FIGS. 1 and 2, it will be appreciated that the mobile device 1002 is an example of the first device 2, the battery 1004 is an example of the second device 4, and the method of FIG. 5 is an example of the method of FIG. 2.

Figure 6:
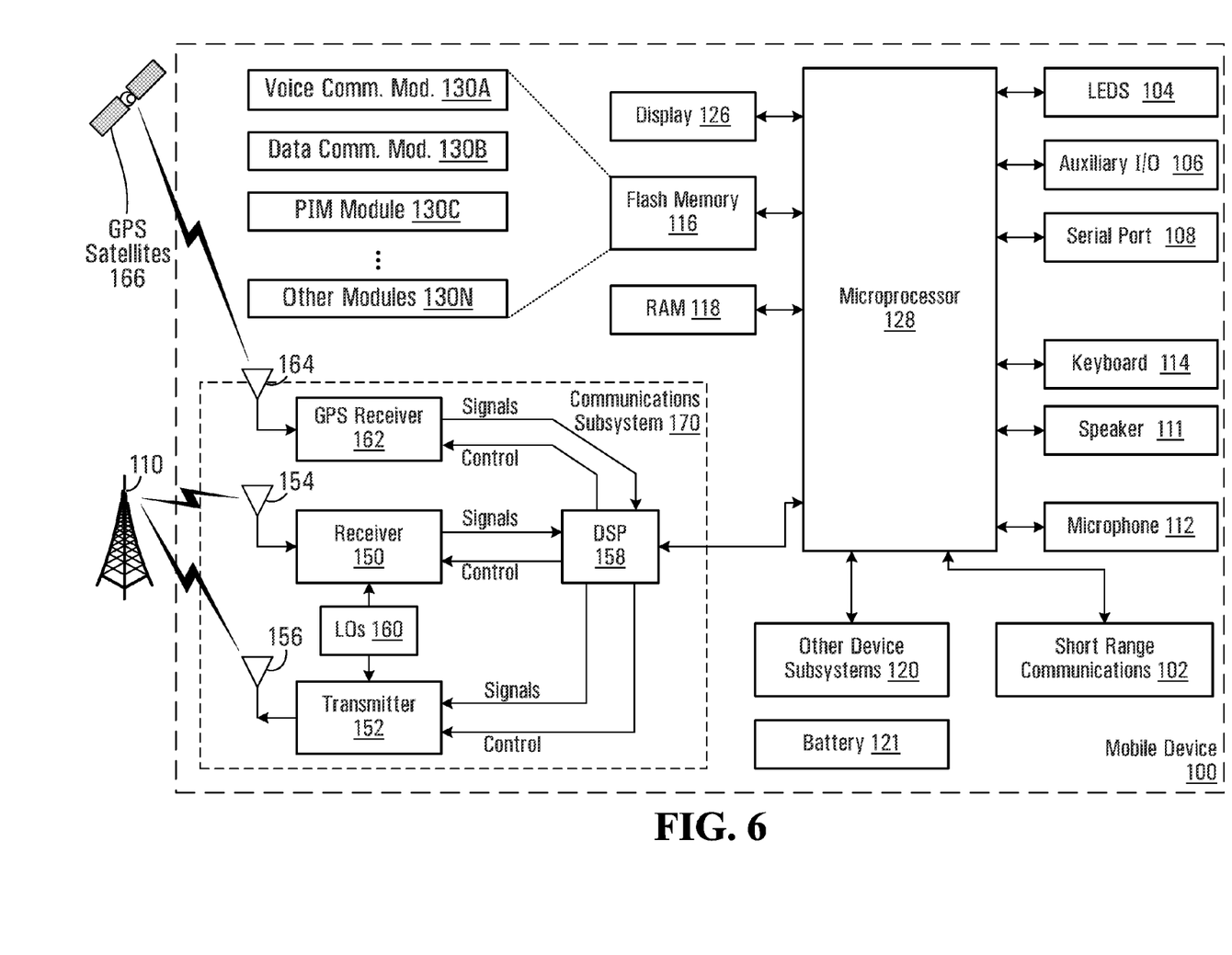
FIG. 6 is a block diagram of another mobile device.

Referring now to FIG. 6, a block diagram is shown of an embodiment of another mobile device 100 that may implement any of the methods described herein. For example, the mobile device 100 may be an example of the first device 2, the second device 4, or the mobile device 1002. The mobile device 100 is shown with specific components for implementing different features including (for example), the features of the mobile device shown in FIG. 4. It is to be understood that the mobile device 100 is shown with very specific details for exemplary purposes only.

The mobile device 100 has a housing that may be elongated vertically, or may take on other sizes and shapes (including clamshell housing structures). The keyboard 114 may include a mode selection key, or other hardware or software for switching between text entry and telephony entry. Alternatively, the mobile device 100 may have a housing that does not take on other sizes and shapes.

A microprocessor 128 is shown schematically as coupled between a keyboard 114 and a display 126. The microprocessor 128 controls operation of the display 126, as well as overall operation of the mobile device 100, in response to actuation of keys on the keyboard 114 by a user.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The keyboard 114, speaker 111, microphone 112, display 126, and LEDs 104 are part of the user-interface.

The mobile device 100 may have a battery 121 to power the active elements of the mobile device 100. The battery 121 may be authenticated by the mobile device 100 using the method of FIG. 2, 3, or 5.

The mobile device 100 is in some embodiments a two-way radio frequency (RF) communication device having voice and data communication capabilities. In addition, the mobile device 100 in some embodiments has the capability to communicate with other computer systems via the Internet. The two-way RF communication is for communicating with a network.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system.

Additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152, a GPS receiver 162, and one or more antennas, illustrated as a receive antenna 154, a transmit antenna 156, and a GPS antenna 164. In addition, the communication subsystem 170 also includes a processing module, such as a digital signal processor (DSP) 158, and local oscillators (LOs) 160. The communications subsystem 170 is used to communicate with a network.

The specific design and implementation of the communication subsystem 170 is dependent upon the communication network in which the mobile device 100 is intended to operate. For example, the communication subsystem 170 of the mobile device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. The communication subsystem 170 may also be designed to operate with an 802.11 Wi-Fi network, and/or an 802.16 WiMAX network. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a UICC, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or downloaded web page, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are known in the art and are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

The microprocessor 128 may implement all or some of the functions of processor 12 or processor 1012. The memory 118 may implement some or all of memory 10 or memory 1010.

Although the foregoing has been described with reference to certain specific embodiments, various modifications thereof will be apparent to those skilled in the art without departing from the scope of the claims appended hereto.

As one example, in the embodiments shown in the figures, the second device has stored thereon secret information s. Alternatively, the second device may have a look-up table of all possible challenge values it can expect to receive and associated response values. In such embodiments, the "secret information" could be considered to be the response values stored in the second device. These response values would be masked in the manner described herein.

In view of, and in addition to, all of the foregoing, some general embodiments will now be described and summarized before proceeding to the claims.

In some embodiments, there is provided a method for a first device to authenticate a second device, the method performed by the first device and comprising: the first device sending to the second device a challenge value corresponding to an expected response value known by the first device, and a hiding value; the first device receiving from the second device a masked response value; the first device obtaining an expected masked response value from the expected response value and the hiding value; the first device determining whether the expected masked response value matches the masked response value received from the second device.

In some embodiments, the method may be repeated using a different hiding value.

In some embodiments, the masked response value received from the second device may have been computed by the second device using the challenge value, the hiding value, and secret information known to the second device.

In some embodiments, the secret information may not be known to the first device.

In some embodiments, the challenge value and the expected response value may be stored on the first device.

In some embodiments, obtaining the expected masked response value from the expected response value and the hiding value may comprise computing the expected masked response value by performing a cryptographic hash of a message that comprises the expected response value and the hiding value.

In some embodiments, the expected masked response value may be computed as xmaskres=cryptographic hash (xres∥h), where xmaskres is the expected masked response value, cryptographic hash(•) is the cryptographic hash, xres is the expected response, h is the hiding value, and ∥ represents concatenation.

In some embodiments, the cryptographic hash may be one that is progressively computed.

In some embodiments, the cryptographic hash may be the same as a cryptographic hash used by the second device to compute the masked response value.

In some embodiments, the cryptographic hash may not incorporate a value representing a length of the message into the input of the cryptographic hash.

In some embodiments, the first device may be a mobile device.

In some embodiments, the second device may be a battery.

In some embodiments, there is a provided a device configured to perform any one of the methods described above. In some such embodiments, the device may comprise: a memory configured to store a challenge value and an expected response value corresponding to the challenge value; and an interface configured to send to another device the challenge value and a hiding value, and to receive a masked response value from the another device. The device may be configured to obtain an expected masked response value from the expected response value and the hiding value, and to determine whether the expected masked response value matches the masked response value received from the another device. In some such embodiments, the device may comprise a processor configured to compute the expected masked response value from the expected response value and the hiding value and/or to determine whether the expected masked response value matches the masked response value. In some embodiments, the device may be a mobile device. In some embodiments, the another device may be a battery.

In some embodiments, there is provided a processor readable medium having stored thereon processor readable instructions that, when executed, cause a first device to authenticate a second device by performing any one of the methods described above.

In some embodiments, there is provided a method for a second device to be authenticated by a first device, the method performed by the second device and comprising: the second device receiving from the first device a challenge value and a hiding value; the second device computing a masked response value using the challenge value, the hiding value, and secret information known to the second device; the second device sending to the first device the masked response value for comparison to an expected masked response value.

In some embodiments, the method may be repeated using a different hiding value received from the first device.

In some embodiments, computing the masked response value may comprise first computing a response value using the challenge value and the secret information, and then computing the masked response value using the response value and the hiding value.

In some embodiments, computing the masked response value may comprise first computing a cryptographic hash of a message comprising the challenge value and the secret information to obtain a response value, and then computing a cryptographic hash of another message comprising the response value and the hiding value to obtain the masked response value.

In some embodiments, the cryptographic hash used to obtain the response value may be the same as the cryptographic hash used to obtain the masked response value.

In some embodiments, computing the masked response value may comprise computing a cryptographic hash of a message comprising the challenge value, the hiding value, and the secret information.

In some embodiments, the cryptographic hash may be one that is progressively computed.

In some embodiments, the cryptographic hash may be the same as a cryptographic hash used by the first device to compute the expected masked response value.

In some embodiments, the expected masked response value may be computed (or may be expected to be computed) by the first device using the hiding value and an expected response value known by the first device and corresponding to the challenge value.

In some embodiments, the secret information may not be known to the first device.

In some embodiments, the first device may be a mobile device.

In some embodiments, the second device may be a battery.

In some embodiments, there is a provided a device configured to perform any one of the methods described above. In some such embodiments, the device may comprise: a memory configured to store secret information; an interface configured to receive from another device a challenge value and a hiding value, and to send to the another device a masked response value for comparison to an expected masked response value; and a processor configured to compute the masked response value using the challenge value, the hiding value, and the secret information. In some such embodiments, the interface may be further configured to receive from the another device different hiding values such that a subsequent hiding value received from the another device and used in computing a subsequent masked response value is different from the hiding value. In some embodiments, the device may be a battery. In some embodiments, the another device may be a mobile device.

In some embodiments, there is provided a processor readable medium having stored thereon processor readable instructions for a second device to be authenticated by a first device; the processor readable instructions, when executed, cause the second device to perform any one of the methods described above.

The invention claimed is:

1. A method for a first device to authenticate a second device, the method performed by the first device and comprising:
   the first device sending to the second device a challenge value and a hiding value, wherein the challenge value corresponds to an expected response value known by the first device, and the challenge value and the expected response value are loaded into memory of the first device at a time of manufacture of the first device;
   the first device receiving from the second device a masked response value, wherein the masked response value is computed by the second device from the challenge value, the hiding value, and secret information known to the second device and unknown to the first device;
   the first device computing an expected masked response value from the expected response value and the hiding value;
   the first device determining whether the expected masked response value matches the masked response value received from the second device; and
   repeating the sending, receiving, computing, and determining, when authentication of the second device is to be performed again, using a different hiding value and the same challenge value.

2. The method of claim 1, wherein said computing the expected masked response value from the expected response value and the hiding value comprises computing the expected masked response value by performing a cryptographic hash of a message that comprises the expected response value and the hiding value.

3. The method of claim 2, wherein the expected masked response value is computed as xmaskres=cryptographic hash(xres∥h), where xmaskres is the expected masked response value, cryptographic hash(•) is the cryptographic hash, xres is the expected response, h is the hiding value, and ∥ represents concatenation.

4. The method of claim 2, wherein the cryptographic hash is one that is progressively computed and is the same as a cryptographic hash used by the second device to compute the masked response value.

5. The method of claim 4, wherein the cryptographic hash does not incorporate a value representing a length of the message into the input of the cryptographic hash.

6. The method of claim 1, wherein the first device is a mobile device and the second device is a battery.

7. A device comprising:
a memory configured to store a challenge value and an expected response value corresponding to the challenge value; and
an interface configured to send to another device the challenge value and a hiding value, and to receive a masked response value from the another device, the masked response value is computed by the another device from the challenge value, the hiding value, and secret information known to the another device and unknown to the device;
the device configured to compute an expected masked response value from the expected response value and the hiding value, and to determine whether the expected masked response value matches the masked response value received from the another device, wherein the challenge value corresponds to the expected response value, the challenge value and the expected response value are loaded into memory of the device at a time of manufacture of the first device;
wherein, when authentication of the another device is to be performed again, the interface is further configured to send to the another device a different hiding value and the same challenge value, and the device is configured to compute another expected masked response value from said expected response value and said different hiding value.

8. The device of claim 7, further comprising a processor configured to compute the expected masked response value from the expected response value and the hiding value and to determine whether the expected masked response value matches the masked response value.

9. The device of claim 7, wherein the device is a mobile device and the another device is a battery.

10. The device of claim 7, wherein the device is configured to compute the expected masked response value by performing a cryptographic hash of a message that comprises the expected response value and the hiding value.

11. A non-transitory processor readable medium having stored thereon processor readable instructions that, when executed, cause a first device to authenticate a second device by performing operations comprising:
sending to the second device a challenge value and a hiding value, wherein the challenge value corresponds to an expected response value known by the first device, and the challenge value and the expected response value are loaded into memory of the first device at a time of manufacture of the first device;
receiving from the second device a masked response value, wherein the masked response value is computed by the second device from the challenge value, the hiding value, and secret information known to the second device and unknown to the first device;
computing an expected masked response value from the expected response value and the hiding value;
determining whether the expected masked response value matches the masked response value received from the second device;
repeating the sending, receiving, computing, and determining, when authentication of the second device is to be performed again, using a different hiding value and the same challenge value.

* * * * *